US007100797B2

(12) United States Patent
Kahn et al.

(10) Patent No.: US 7,100,797 B2
(45) Date of Patent: Sep. 5, 2006

(54) ONE DOSE AT-A-TIME PILL DISPENSER AND CONTAINER HAVING SAME

(75) Inventors: Shaan Kahn, Plainview, NY (US); Matthew Curtin, Lompoc, CA (US); John Cogger, Santa Ana, CA (US); Charles R. Kalina, Jr., Irvine, CA (US)

(73) Assignee: Talisman Technologies, LLC, Plainview, NY (US)

( * ) Notice: Subject to any disclaimer, the term of this patent is extended or adjusted under 35 U.S.C. 154(b) by 71 days.

(21) Appl. No.: 10/886,826

(22) Filed: Jul. 8, 2004

(65) Prior Publication Data

US 2005/0029154 A1 Feb. 10, 2005

(51) Int. Cl.
*G07F 11/00* (2006.01)
*B65G 59/00* (2006.01)

(52) U.S. Cl. ...................... 221/288; 221/263; 221/277; 221/264; 221/265

(58) Field of Classification Search ................ 221/154, 221/265, 246, 247, 251, 263
See application file for complete search history.

(56) References Cited

U.S. PATENT DOCUMENTS

| | | | |
|---|---|---|---|
| 2,824,667 A | 2/1958 | Barnett | |
| 3,241,712 A | 3/1966 | Sacchetti et al. | |
| 3,516,536 A | 6/1970 | Ino | |
| 3,610,466 A | 10/1971 | Raybois | |
| 3,874,564 A | 4/1975 | Huneke | |
| 3,896,967 A | 7/1975 | Doolittle | |
| 4,024,984 A * | 5/1977 | Gyimothy et al. | 221/203 |
| 4,084,726 A | 4/1978 | Nicol | |
| 4,595,123 A | 6/1986 | Libit | |
| 4,611,727 A * | 9/1986 | Graff | 221/154 |
| 4,782,980 A * | 11/1988 | Heimlich et al. | 221/265 |
| 5,040,691 A | 8/1991 | Hayes et al. | |
| 5,791,515 A * | 8/1998 | Khan et al. | 221/154 |

* cited by examiner

*Primary Examiner*—Gene O. Crawford
*Assistant Examiner*—Timothy Waggoner
(74) *Attorney, Agent, or Firm*—Levisohn, Berger & Langsam LLP

(57) ABSTRACT

A device for dispensing pills one at a time or one dose at a time includes a unit chamber fittable within/integral with the rim of a bottle. The unit chamber includes a plurality of radial projections which project inwardly to define discrete pill holding areas. The distance between adjacent radial projections is slightly larger than the width of the pill sought to be contained and dispensed by the container. As the bottle is inverted, pills will fall into the pill holding areas, one pill or dosage amount per area. A dispensing cap is rotatable relative to the unit chamber. A single pill-width window in the cap is positionable opposite the pill holding areas of the unit chamber. When a pill is meant to be dispensed, the bottle is inverted or angled downward, and a single pill in the pill holding area opposite the window falls out of the bottle.

18 Claims, 10 Drawing Sheets

ONE DOSE AT-A-TIME PILL DISPENSER AND CONTAINER HAVING SAME

BACKGROUND OF THE INVENTION

1. Field of the Invention

The invention relates to the general field of pill, capsule, tablet, caplet, and bulk powder or granulated supplement (all hereinafter collectively "pill" or "pills") containers for dispensing by individuals. More specifically, the invention relates to a device for attachment to or integration with a pill container that regulates or restricts the number of pills dispensed at a given time.

2. Description of Related Art

Pill containers and dispensers have existed for quite some time. Generally, they comprise a bottle-like holding compartment with a removable cap. The container is initially provided with a large number of doses of the pills and the consumer will desirably dispense to himself or herself one or two of the pills at a time. Often, and of recent, the caps to such containers have been provided with safety mechanisms so that children cannot inadvertently or accidentally gain access to the pills contained in the bottle. That, of course, could be very harmful to a young child, should he or she ingest a number of the pills.

Many safety mechanisms have been developed over recent years, most requiring two or more discrete different movements, and sequential hand movements to gain access to the inside of the bottle so as to obtain a pill. For example, a very common safety mechanism incorporated into commercially available pill dispensers today requires the simultaneous pushing down on the cap of the device while turning the cap so as to cause alignment of portions, thereby allowing the cap to be removed. However, with the known prior art devices, the removal of the cap provides access to all of the interior contents. Thus, a child who even accidentally discovers the method of gaining access to the interior of the bottle or, also possibly, an adult who disables the safety mechanism because of the dexterity and/or strength required to overcome it (which is often difficult for many, especially arthritic persons), unavoidably provides a potentially dangerous implement to a child: an open bottle with medication containing a plurality of pills.

A major drawback to the conventional pill bottle, and even the conventional safety cap for same, is that once the bottle/cap is opened, the user has access to all of the pills inside whether he wants such access or not. Typically, one opens the bottle and gently tries to shake out the desired dose, usually one or two pills. However, it is quite common that far more than one or two pills emerge from the bottle as a result of the shaking. The prior art devices thus allow a user to remove many pills at once and then the individual replaces the excess (not-to-be ingested) pills back into the bottle only after his or her fingers have touched the same. If the person lives alone, this is not such a problem. However, in many situations, a bottle with multiple pills is accessible to many individuals, as, for example, a bottle of aspirin pills in an office with many workers. It is unsanitary for multiple people to touch and subsequently replace pills, especially when the typical user of such pills may be sick.

One advance in the art appears in U.S. Pat. No. 5,791,515 to Khan et al., created by two of the instant inventors, the teachings of which are incorporated by reference herein. The components of that patented device provide gentle nudging of the contained pills such that as one pill is dispensed, the internal pills are mixed, leading to more pills falling into any of the empty chambers for subsequent dispensing. The second "stroke" of the dispensing cycle, i.e., when the cap is rotated clockwise to dispense a pill, causes the pawl of the cap to push against the edge of the walls of the wheel-like component and to tend to deflect the holding plate from its horizontal orientation. Once the pawl is through with its cycle, the snapping of it back into position, ready to turn the next chamber of the wheel-like component (by interengagement with an edge of a wall of a chamber), causes a realignment, shaking, or vibration of the pills within the container. This facilitates the mixing of the pills such that they will fall into any empty chambers. The wheel-like component is attached to the holding plate. Once the wheel-like component is pushed by the pawl, the holding plate flexes and then snaps back into its non-flexed position, after the pawl passes under the wheel-like component. This causes the dispensing of one pill at a time. The sweeping blades also facilitate the mixing and alignment of pills with any empty chambers for subsequent, one-at-a-time dispensing. The sweeping blades direct the pills downwardly and away from the center, i.e., into the outside chambers when the cap is directed downwardly, to help the dispensing process.

The main drawback to the prior Khan device is that it is complicated and expensive to make and use. The prior device required no fewer than five separate pieces to accomplish its objective of dispensing one pill at a time. While the device did function in the desired manner, it has been commercially stagnant because it is perceived to be difficult and expensive to manufacture.

SUMMARY OF THE INVENTION

Accordingly, it is an object of the present invention to provide a container or bottle for capsules, tablets, pills, etc. ("pills") which allows for the efficient storage of large numbers and, yet, the storage container is provided with a mechanism for dispensing one pill at a time.

It is a further object of the present invention to provide a storage container or bottle for pills which allow the pills to be placed into a common storage area in a random manner, instead of isolated in individually sealed compartments (e.g., a "blister pack" having a plastic tray with a number of recesses covered and sealed by a paper or foil sheet). Even though stored in this random manner, the present invention enables simple to use, one-at-a-time pill dispensing.

It is also an object of the present invention to provide a one-at-a-time pill (or dosage) dispenser which is inexpensive to manufacture and which can be made either as a retrofit cap to existing bottles and containers or, in the alternative, as a new article of manufacture integral with a bottle.

It is an object of the present invention to provide a pill dispenser with a safety mechanism which requires adult-like manual dexterity to override so that the overall medication container is child-resistant. It is also an object of the present invention that even if a child manages to determine how to remove pills from the bottle, access to one or more of the pills within the storage chamber is limited to the dispensing of a single pill (or dosage, which may be two pills) at a time.

It is another object of the present invention to provide an inexpensive, easy to manufacture, and reliable one-at-a-time pill or dosage dispenser. In this manner, an individual who requires one or two pills, for example, will not unnecessarily touch the other pills within the container. More specifically, for example, in an office environment, a single large capacity bottle of aspirin or headache relief pills can be found. One individual needing one or two pills should not come into contact, for hygienic reasons, with more than the number of pills he or she needs for that medication need. Yet, using conventional pill containers now on the market, the individual will open the bottle, pour many such pills into his hand, take one or two orally, and then funnel the balance back into the bottle for someone else's later use. Clearly, this is not hygienic. Indeed, germs present on the first user's hands can come into contact with the returned pills and grow and germinate within the bottle. The present invention provides a container for a large number of pills, allows them to be randomly stored in the storage container for space-efficient purposes, and yet allows only the number of dosages of pills to be dispensed as are required at that particular time. This is very hygienic and desirable.

It is an object of the present invention to provide a pill dispenser intended for one-at-a-time pill or dosage dispensing which can fit, as a cap, atop the pill container or storage portion of existing pill or bulk-supplement dispensing bottles. This reduces the expense involved in implementing the present invention into the marketplace. Thus, the main storage container of the present invention is substantially the same as that previously used by commercial medication and supplement manufacturers.

It is also an object of the present invention to provide a totally plastic construction for medication storage and one-at-a-time pill or dosage dispensing. The use of plastic makes the device capable of easy mass manufacturing at a minimum cost. Also, the use of plastic components allows for an air tight construction, desirable in the hygienic storage of pills.

The above and other objects are fulfilled by the invention, which is a device for dispensing pills one at a time or one dose at a time. The device includes a unit chamber which fits within or is made integral with the rim of a bottle of pills. The unit chamber includes a plurality of radial projections which project inwardly and are formed on the inner circumference of the chamber. Between the radial projections are defined discrete pill holding areas. The distance between adjacent radial projections is preferably only slightly larger than the width of the pill sought to be contained and dispensed by the container. As the bottle is inverted or angled upside-down for dispensing medication, pills will fall into the pill holding areas, one pill or dosage amount per area.

The device also includes a dispensing cap secured to but rotatable relative to the unit chamber. The dispensing cap is provided with a pill-impermeable base having a window formed therethrough. The single pill-width window is selectively, rotatively positionable opposite the pill holding areas of the unit chamber; rotation of the dispensing cap locates the window in alignment with successive pill holding areas. The dispensing cap preferably includes a central hub formed on the inner side or underside of the base when the container is rightside-up, i.e., base of container down and cap located above. (When pills are meant to be dispensed, the bottle is inverted (base of container up, cap down) or at least angled with the mouth of the bottle downward.) The hub delimits an inner boundary of the pill holding areas which are otherwise only defined by the inner circumference of the unit chamber and the radial projections of the unit chamber. That is, two adjacent projections and the central hub preferably define a set area/volume which can contain one pill (the outer wall that defines a pill holding area is, of course, the rim of the unit chamber itself). The central hub may be conical, cylindrical, or of similar geometry.

A blocking tab is preferably provided and projects downward (when the container has its base down) from the underside of the base of the dispensing cap adjacent to the window. The blocking tab is provided near or as a portion of the central hub. The blocking tab is preferably provided with a distal flange on its free end. The tab is dimensioned sufficiently in length so that, with the device in the pill dispensing position (base up, cap down), the distal flange scoops or passes by a pill in a pill holding area (preferably, even between pills in contact with one another) while preventing other pills still within the bottle from also dropping down into the pill holding area and through the window.

The dispensing cap also preferably includes a cover hingedly attached to the base for covering the outside of the base and thus the window, thereby preventing ambient air and its associated contaminants from entering the bottle and ruining its contents when the device is not in use.

The unit chamber may include a plurality of claws respectively extending below (or, when the bottle is inverted for pill dispensing, above) the pill holding areas. Each claw projects from the unit chamber into the bottle and preferably has a free end that either gently curves inward or is substantially perpendicular to the rest of the claw (that is, it can curve approximately 90° from the main portion of the claw). These claws help prevent more than one pill or dosage from falling into a given pill holding area at a time.

In use, the device functions as follows. The bottle is turned upside-down or is angled with the mouth of the bottle downwards for pill dispensing. Pills stored in the main portion of the bottle fall into the pill holding areas of the unit chamber. The claws prevent more than one pill from falling into a given pill holding area. The pills in the pill holding areas are retained by the inside surface of the base of the dispensing cap. The user unflaps the cover from the base and then rotates the dispensing cap with respect to the container so that the window is aligned with a pill holding area. The pill—and only the pill in the pill or dosage holding area that is aligned with the window—falls by gravity out of the bottle, presumably into the user's below-located hand or onto a table, into a cup, or the like.

DETAILED DESCRIPTION OF THE PREFERRED EMBODIMENTS AND THE DRAWINGS

Description of a preferred embodiment of the invention will now be given with reference to the attached FIGS. 1–14. It should be understood that these figures are exemplary in nature and in no way serve to limit the scope of the invention, which is defined by the claims appearing hereinbelow. It should also be understood that the invention is a pill container which sits with its base on a shelf or table, top or cap up with ready to dispense pills. When a pill or dosage is desired, the container and cap are inverted or angled with the top or cap end downward and the container's base upward. The description hereinbelow, unless otherwise noted, indicates the relative positions of various elements when the bottle is rightside-up, as shown in FIGS. 1–5, for example.

Figure 2:
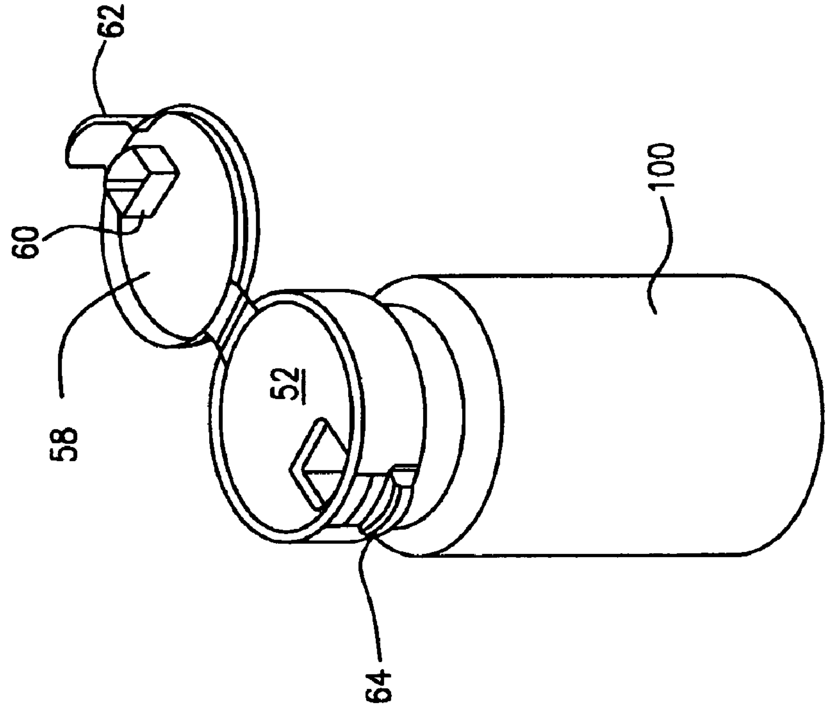
FIG. 2 is a perspective view of the dispenser of FIG. 1 in an open configuration atop a pill bottle.
Figure 1:
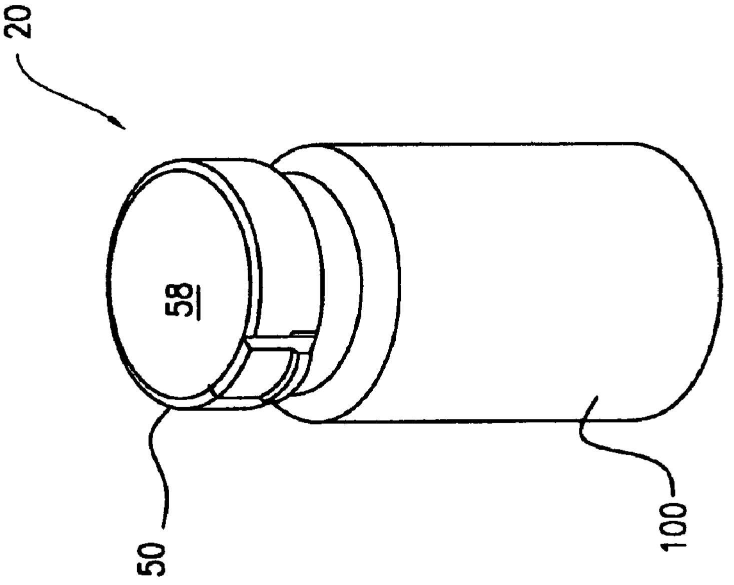
FIG. 1 is a perspective view of a dispenser in accordance with the invention in a closed configuration atop a pill bottle.
Figure 3:
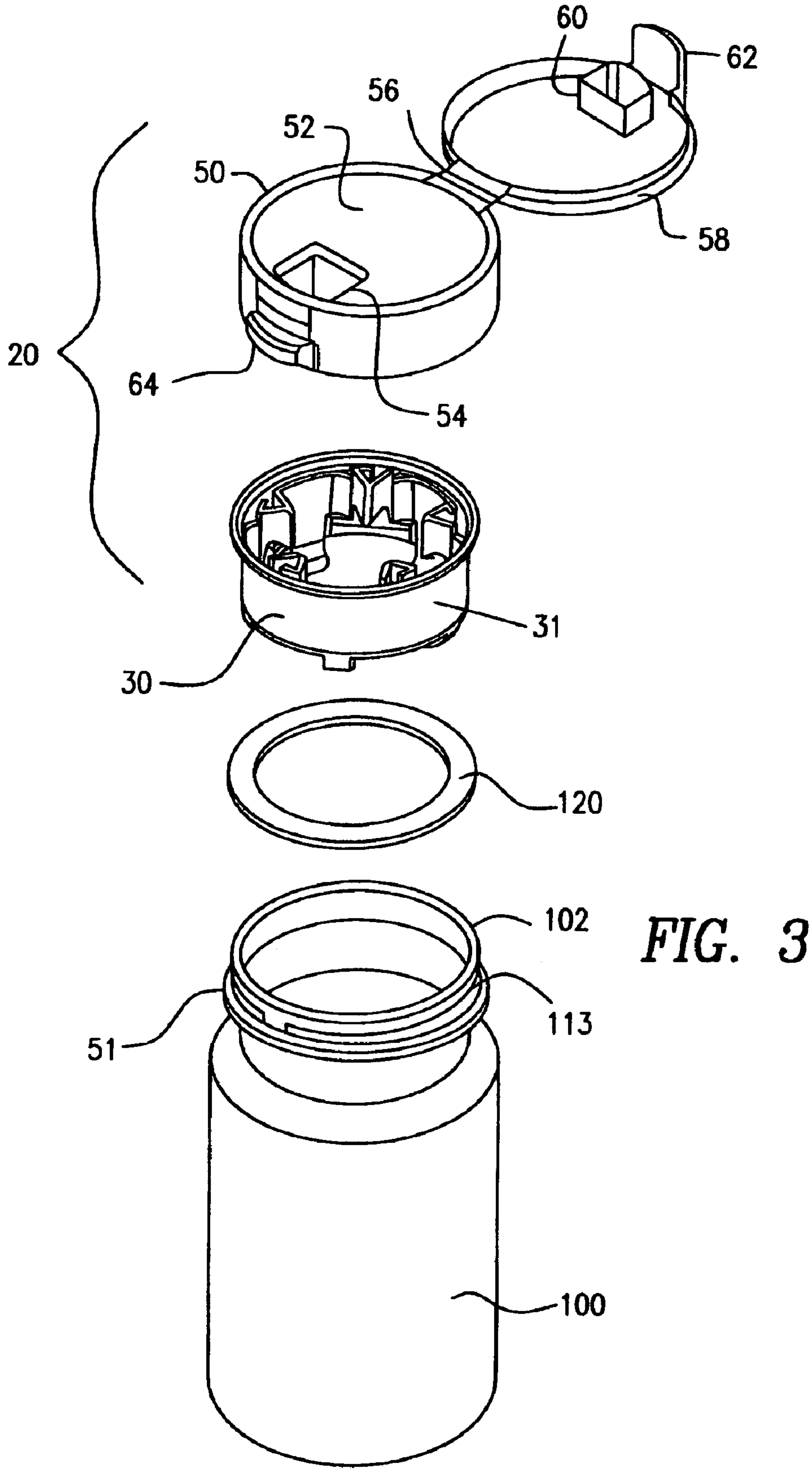
FIG. 3 is an exploded perspective view of the dispenser of FIG. 1 in an open configuration with a pill bottle.

The invention is a device 20 for dispensing pills one at a time or one dose at a time. As mentioned above, a prior one-at-a-time pill dispenser created by two of the same inventors herein required numerous parts. As shown in FIGS. 1–3, the instant device 20 only requires two pieces besides the holding bottle: a circumferential unit chamber 30 and a dispensing cap 50. Fewer parts may still be possible and yet not depart from the present invention.

Figure 6:
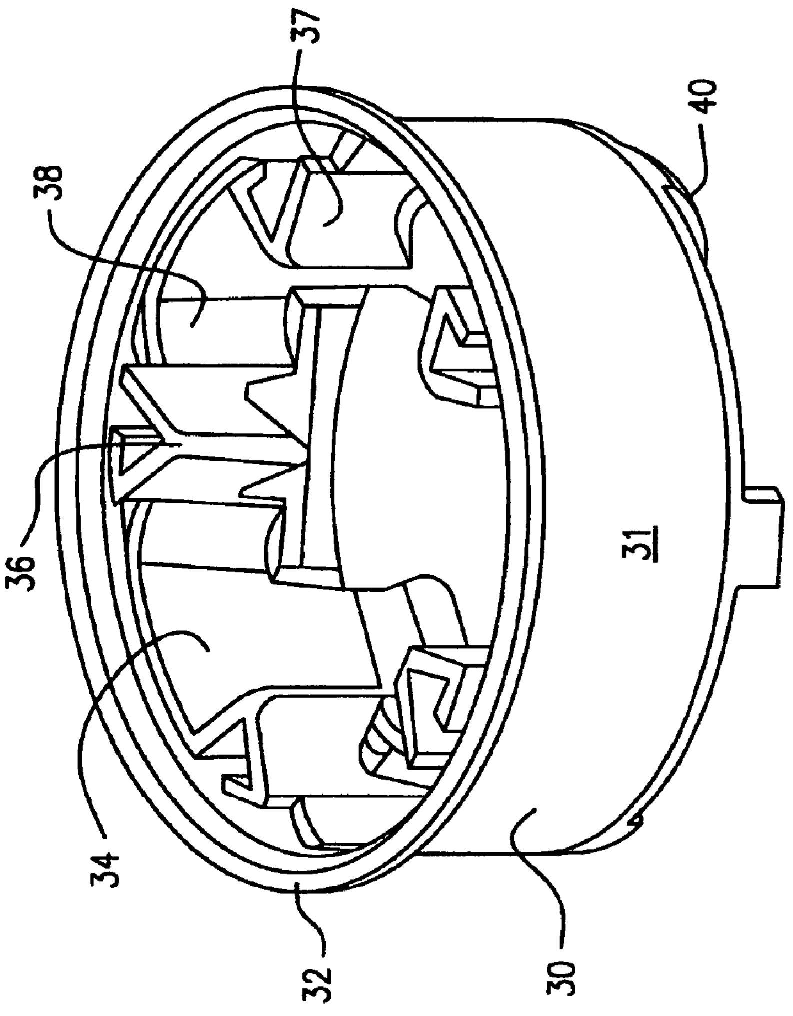
FIG. 6 is a perspective view of a unit chamber of a dispenser in accordance with the invention.
Figure 8:
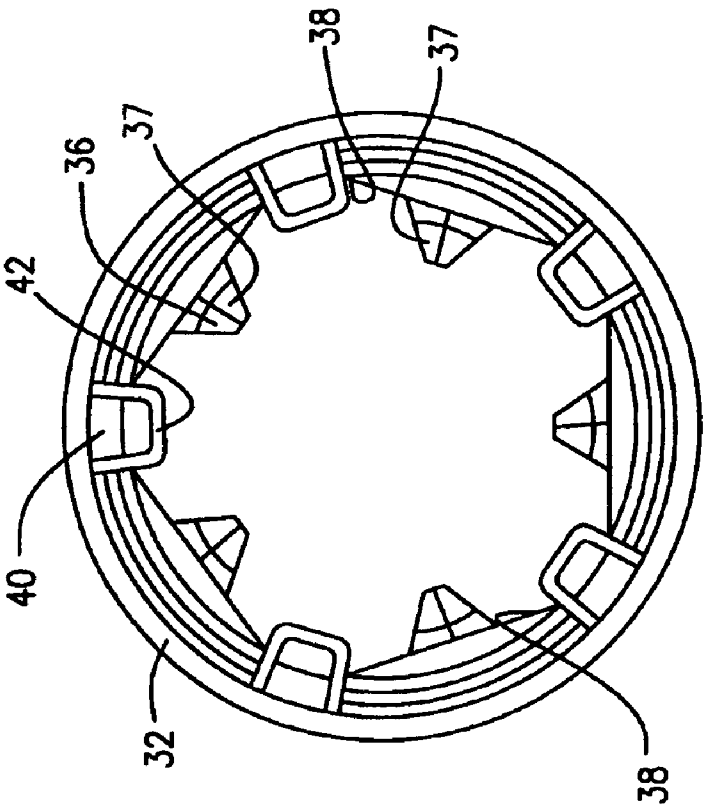
FIG. 8 is a bottom elevation view of the unit chamber of FIG. 6.
Figure 7:
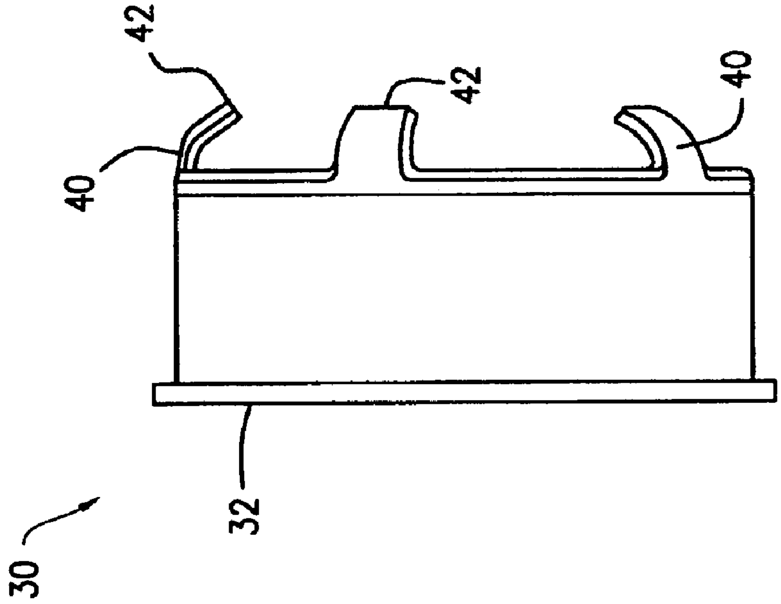
FIG. 7 is a side elevation view of the unit chamber of FIG. 6.
Figure 9:
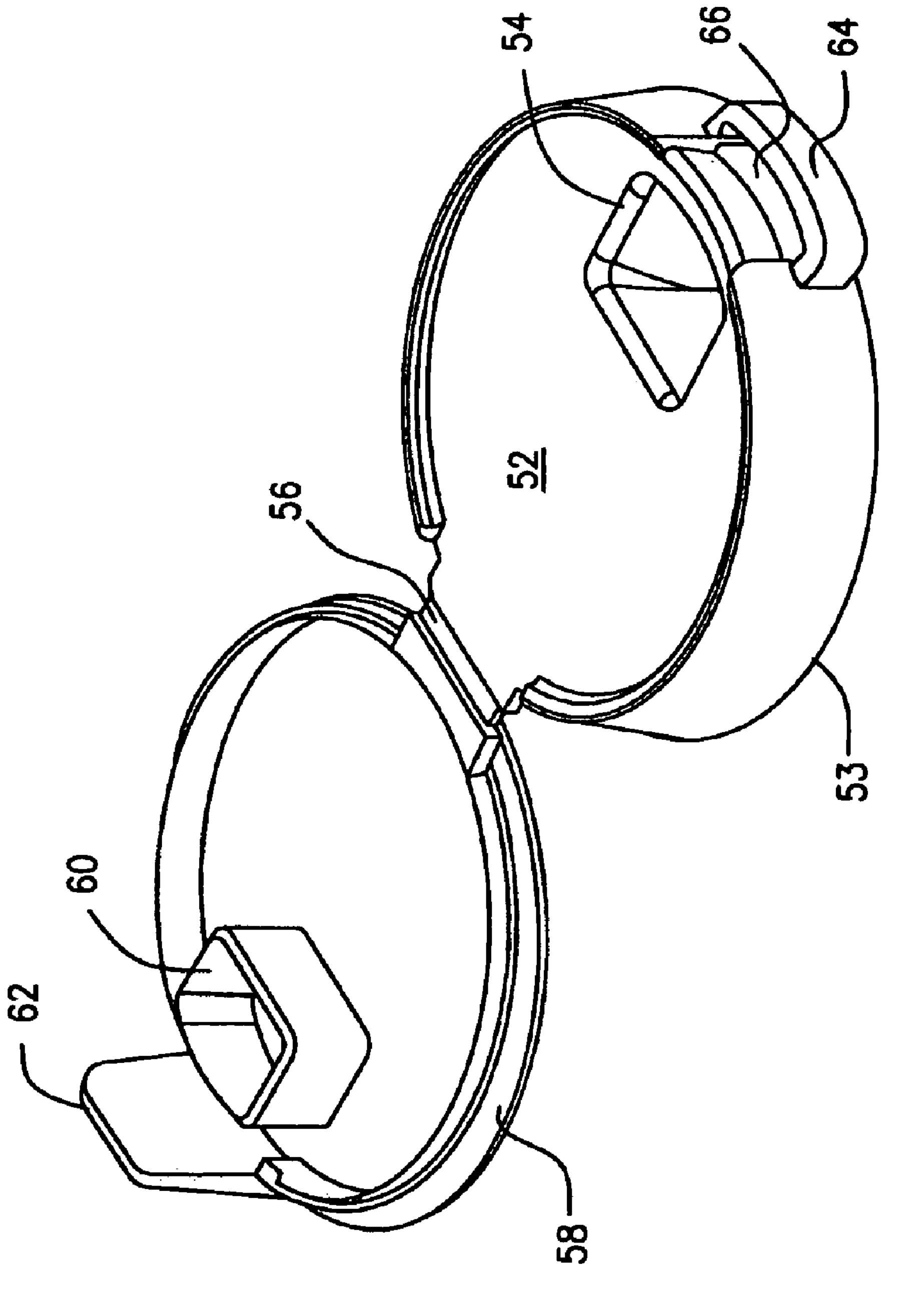
FIG. 9 is a top perspective view of a cap of a dispenser in accordance with the invention with the cover hinged open.

Unit chamber 30 fits within the rim 102 of a standard pill bottle 100. Alternatively, unit chamber 30 can be made integral with a pill bottle as one piece of molded plastic. Unit chamber 30 is best illustrated in FIGS. 6–8. Unit chamber 30 includes an outer circumferential surface 31 which fits within the upper portion of bottle 100. An upper flange 32 sits upon or engages the lip or rim 102 of bottle 100 and ensures that unit chamber 30 does not slip down into the bottle. A plurality of radial projections 36 formed on the inner circumference 34 of the unit chamber 30 project inwards, and between adjacent radial projections 36 are defined discrete pill holding areas 38. The width of a pill holding area 38 (e.g., the distance between facing side walls 37 of adjacent radial projections 36) is preferably only slightly larger than the width of a pill 110 (see FIGS. 5 and 8) or dosage, e.g., two pills, in the container 10. As the bottle is turned or angled upside-down, for pill dispensing, pills 110 will fall into pill holding areas 38, one pill or dosage per area.

Unit chamber 30 is shown as fitting around the entire rim of the bottle, however it may also be formed as a half-circle, partial-circle, or similar arcuate shaped element without departing from the scope of the invention.

As best seen in FIGS. 7 and 8, unit chamber 30 may optionally include a plurality of claws 40 respectively extending below the pill holding areas 38. Each claw 40 projects downwardly from the unit chamber 30 into the bottle 100 and preferably has a free end 42 that either curves radically inward or is substantially perpendicular to the rest of the claw (that is, it can curve approximately 90° from the main portion of the claw). These claws help prevent more than one pill 110 from falling into a given pill holding area 38 at a time, when the bottle is inverted for dispensing. Another embodiment of the unit chamber, shown in FIG. 14 as unit chamber 130, does not have such claws, but does have radial projections 136 and pill holding areas 138 similar to those described above.

The device also includes a dispensing cap 50 secured or securable to but rotatable relative to the unit chamber 30. Dispensing cap 50 snap fits over the flange 51 of the bottle. Cap 50 is provided with a flat, pill-impermeable base 52 having a window 54 formed therethrough. The underside of base 52 sits atop flange 32 of unit chamber 30, and the lower rim 53 of base 52 may be supported by flange 51 on bottle 100. Window 54 is rotatably positionable opposite the pill holding areas 38 of unit chamber 30; rotation of the dispensing cap 50 moves the window 54 over successive pill holding areas 38. Attached to base 52 of the cap via hinge 56 (or alternatively by a snap fit) is a cover 58 for covering the top side of base 52 and thus window 54, thereby preventing ambient air and its associated contaminants from entering the bottle and ruining its contents. The underside of cover 58 includes a window plug 60 which fits snugly into window 54 when cover 58 is hingedly placed over base 52. Cover 58 includes a locking tongue 62 which mates with circumferentially extended tab 64 and frictionally fits into slot 66 between tab 64 and base 52 of cap 50. This serves as a child safety mechanism.

Figure 5:
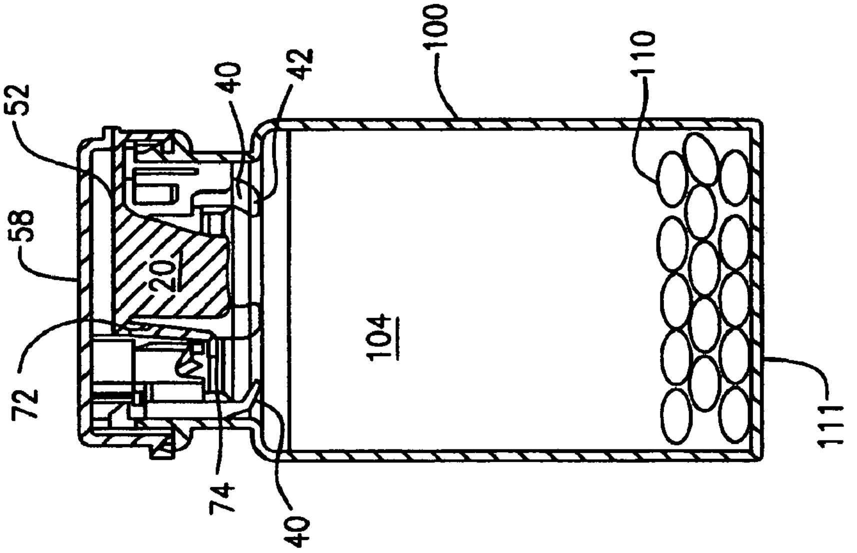
FIG. 5 is a side sectional view of the dispenser of FIG. 1 in a closed configuration atop a pill bottle taken along line V—V of FIG. 4.
Figure 4:
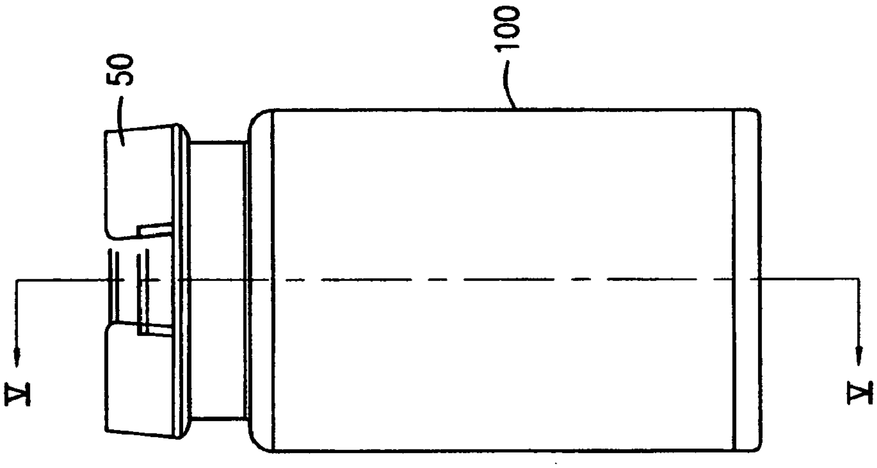
FIG. 4 is a side elevation view of the dispenser of FIG. 1 in a closed configuration atop a pill bottle.
Figure 11:
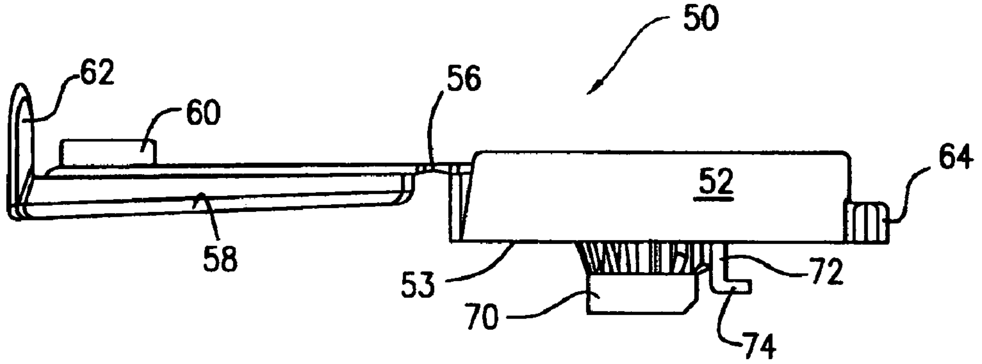
FIG. 11 is a side elevation view of the cap of FIG. 9.
Figure 12:
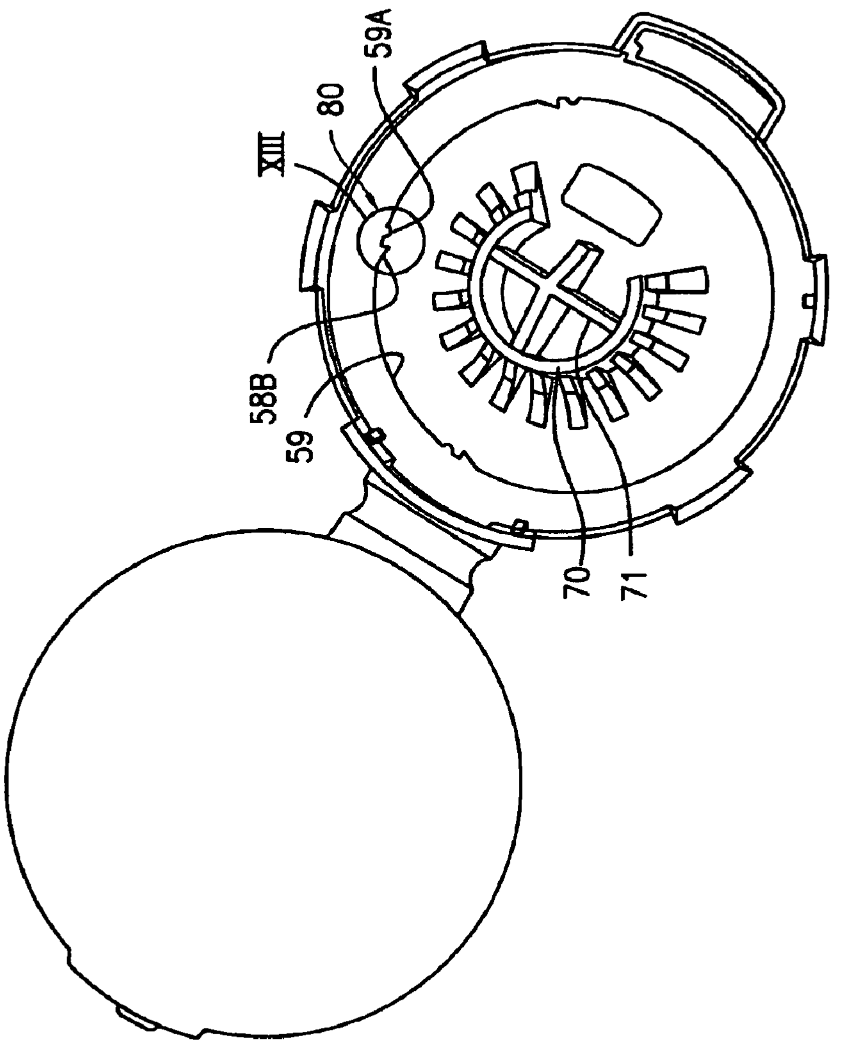
FIG. 12 is a bottom elevation view of the cap of FIG. 9.

As best shown in FIGS. 5 and 11, the dispensing cap 50 preferably includes a central hub 70 formed on the inner or underside of base 52. Hub 70 delimits an inner boundary of the pill holding areas 38 which are otherwise only defined by radial projections 36 of unit chamber 30. That is, two adjacent projections 36 and central hub 70 preferably define a set area/volume which can contain one pill or dosage (the final wall that defines a pill holding area is, of course, the inner rim 34 of the unit chamber 30 itself). Central hub 70 may be conical, frusto-conical, pyramidal, cylindrical, or of similar geometry. In the preferred embodiment, as shown in FIG. 12, central hub 70 includes a central raised portion 71 which substantially comes to a point at its center. Raised portion 71 helps guide pills into pill holding areas 38 when the bottle is inverted. Raised portion 71 may be made from multiple inclined ribs, as shown in FIG. 12, or it may be conical, frusto-conical, pyramidal, or the like (but preferably tapered).

Figure 10:
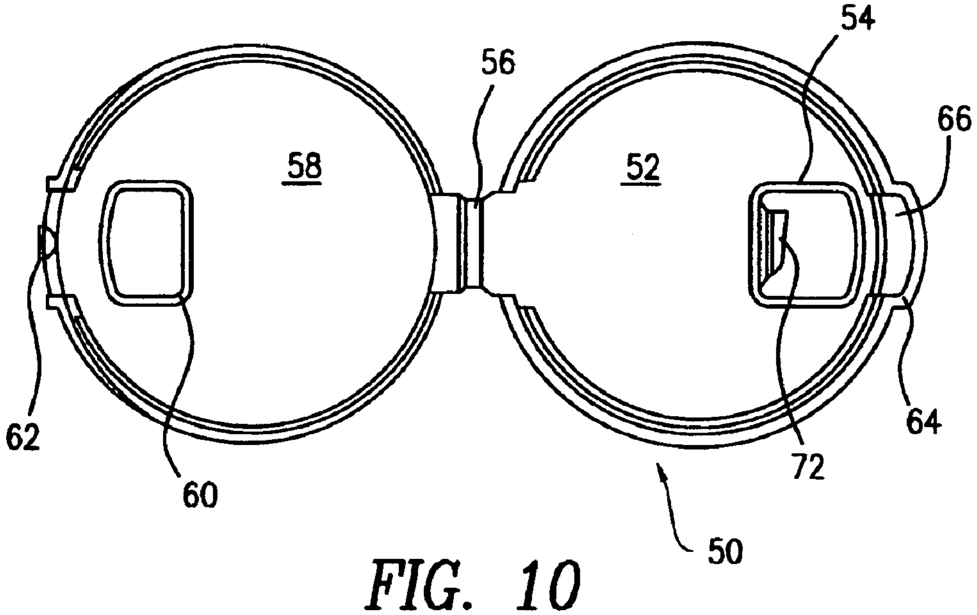
FIG. 10 is a top elevation view of the cap of FIG. 9.

Projecting downward from the underside of base 52 of dispensing cap 50 adjacent to window 54 is preferably provided a blocking tab 72 (see FIGS. 10 and 11). Blocking tab 72 is provided near or as a portion of the central hub 70. The blocking tab is preferably provided with a distal flange 74 on its free end. The tab 72 is dimensioned sufficiently in length so that the distal flange passes above a pill 110 in a pill holding area 38 (when the bottle is inverted for pill dispensing) while preventing other pills still within the bottle from also dropping down into the pill holding area and through the window.

Figure 13:
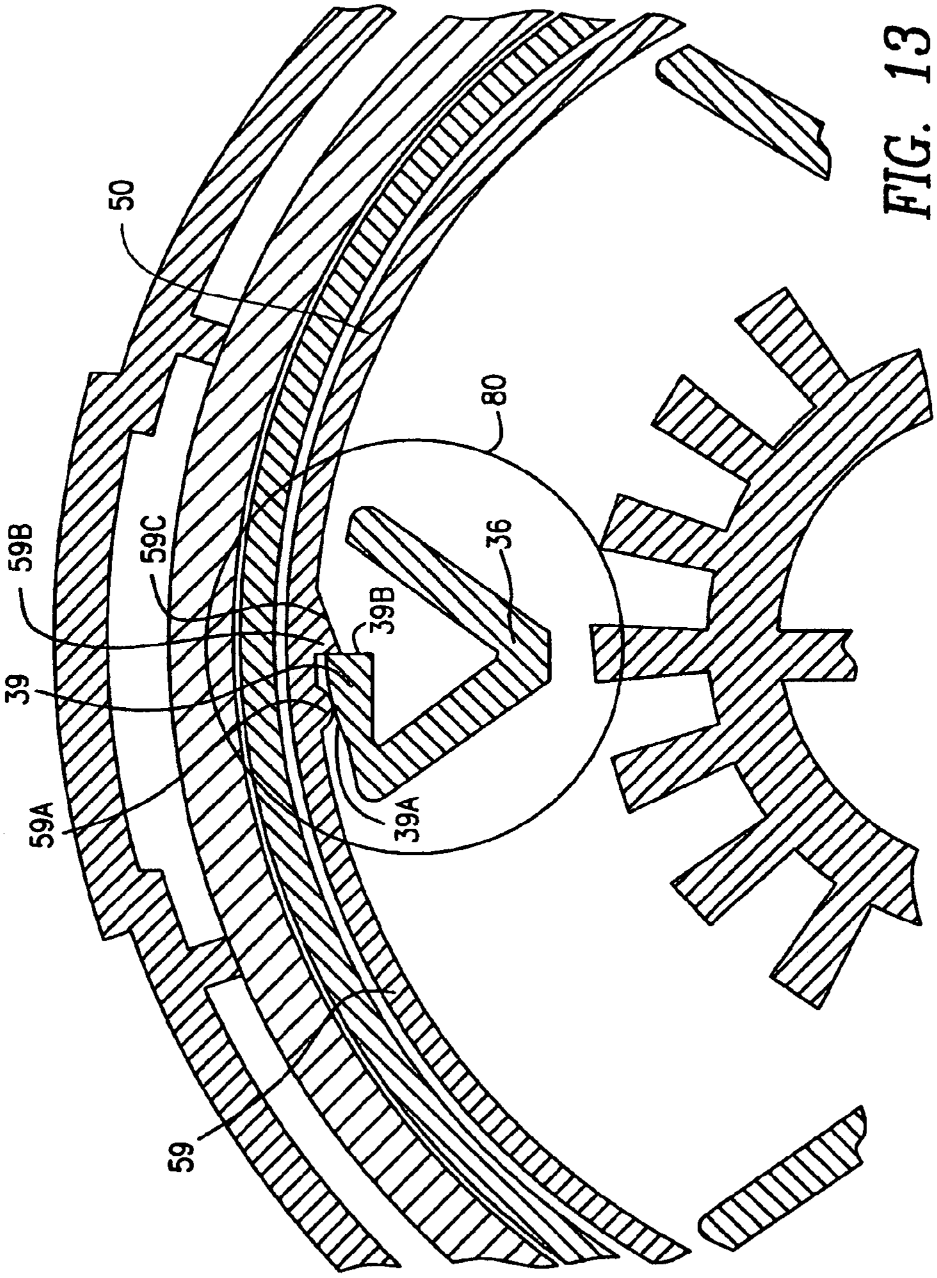
FIG. 13 is an enlarged partial sectional view of the detent mechanism of the cap and unit chamber of a dispenser taken from area XIII of FIG. 12.
Figure 14:
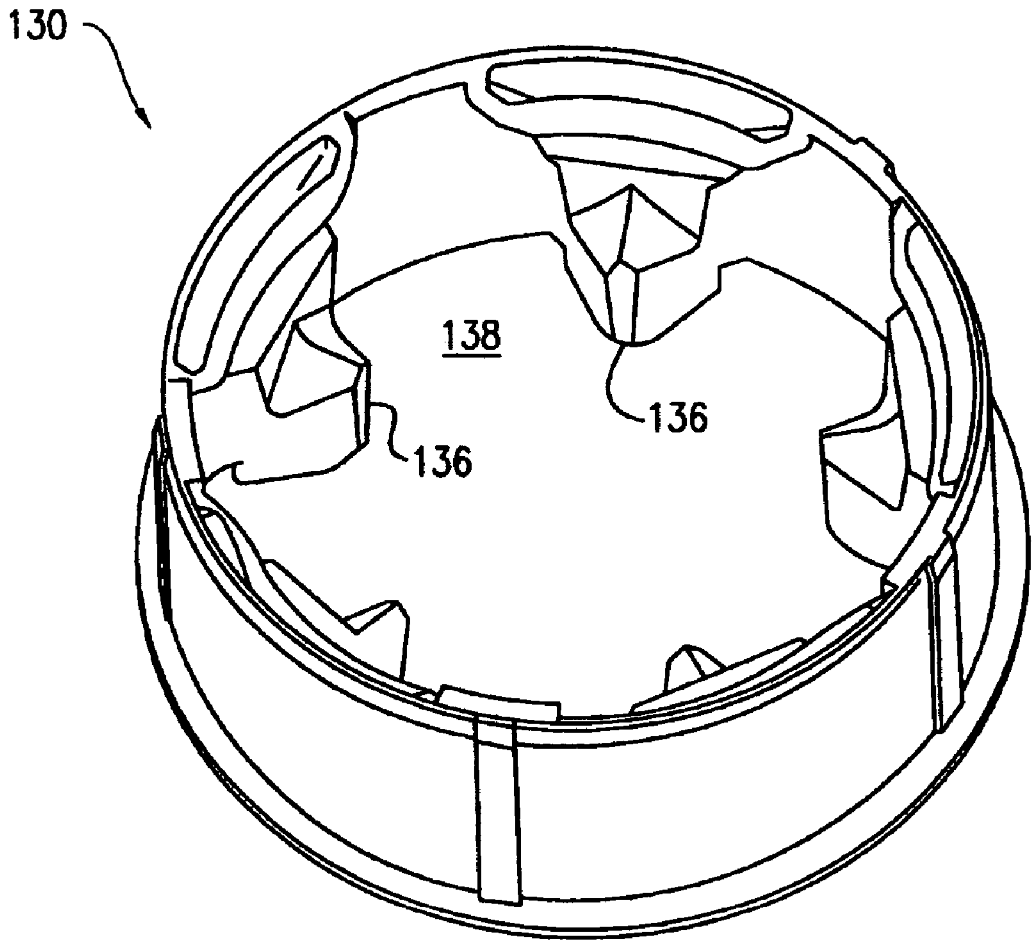
FIG. 14 is a perspective view of another unit chamber in accordance with the invention.

FIGS. 12 and 13 illustrate a detent mechanism 80 formed by the interaction of several portions of both dispensing cap 50 and unit chamber 30. Projection 36 is provided with a cam member 39, which includes a ramped wall 39A and a perpendicular wall 39B. An inner ring 59 of base 52 includes a smoothly raised bump portion 59A and a one-way tooth 59B. When cap 50 is rotated in the direction of arrow A (see FIG. 13), raised bump portion 59A rides up ramped wall 39A and drops off the end of cam member 39; this interaction provides an audible click and a detectable snap that indicates to the user that the window 54 is positioned over a pill holding area 38. Tooth 59B butts against perpendicular wall 39B to prevent, deter, or generally discourage the reverse rotation of the cap 50 with respect to the unit chamber 30. Tooth 59B includes a declined ramped surface 59C which also may ride along ramped wall 39A as the cap is rotated. Together, the interaction between cam member 39 and tooth 59B and then between cam member 39 and raised bump portion 59A cause a double click to occur when the cap is rotated.

While a double click is preferred, a single click may suffice. As such, raised bump portion 59A may be eliminated in favor of the single click provided by the interaction between cam member 39 and tooth 59B. Similarly, although it is preferred to maintain the uni-directionality of the rotation of the cap, a single click may be effected by just raised bump portion 59A, and tooth 59B may be eliminated (though at the cost of preventing or discouraging reverse rotation of the cap). In any event, the detent mechanism 80 allows a person with poor vision to know in an audible and tactile manner when window 54 is aligned with a pill holding area 38.

In use, the device functions as follows. Bottle 100 is turned upside-down or is angled with the mouth of the bottle downwards. Pills 110 stored in the main portion 104 of bottle 100 fall into the pill holding areas 38 of the unit chamber 30. The claws 40 prevent more than one pill from falling into a given pill holding area 38. The pills in the pill holding areas 38 are retained by the base 52 of the dispensing cap 50. The user then rotates the dispensing cap 50 so that the window 54 is aligned with a pill holding area 38. The pill—and only the pill or dosage in the pill holding area aligned with the window—falls out of the bottle and is ready for ingestion by the user. The blocking tab prevents the dispensing of additional unwanted pills from filling the chamber of the emptied cavity when the first pill falls through the window and into the user's hand. The bottle can then be inverted back to its normal position, cap up and container base down for sitting on a shelf or for a second dispensing of a dosage. The latter requires another inverting of the bottle and cap relative rotation.

Some medicines require that two pills be taken at the same time. To this end, in another embodiment, the invention is provided with two windows formed in the base of the dispensing cap. The windows are positioned to align with two pill holding areas at the same time. In a different embodiment, the height or width of the pill holding areas and the blocking tab may be dimensioned so as to allow two pills to fall into a single pill holding area, one on top of the other or one next to the other and a single window allows the two pills to be dispensed. Of course, the one-at-a-time preferred embodiment can be used to dispense more than one pill; the user need only rotate the dispensing cap over two (or more) successive pill holding areas, and two (or more) pills will be dispensed.

The invention is not limited to the above description. For example, it is also contemplated that the invention will serve as a one dose at a time dispenser of powder or granulated supplements. In such an embodiment, the spaces or gaps between the radial projections and the central hub, for example, are made extremely small so that only a predetermined amount of powder or granulated material is held in the pill holding areas and then dispensed when the assembly is inverted. Alternatively, by extending the walls of the dose-defining areas (similar to the pill-holding areas discussed above), the device can be easily adapted for the dispensing of unit doses of powder or granulated material.

Having described the invention, it should be understood that the scope of the invention is not limited to the above description or what is shown in the drawings but is rather defined by the claims appearing hereinbelow. Various modifications and equivalents to the invention are contemplated as being well within the scope of the invention.

What is claimed is:

1. A device for dispensing pills, comprising:

a unit chamber fittable within or integral with the rim of a bottle, including a plurality of radial projections projecting inwardly from an inner circumference of the chamber, said radial projections defining discrete pill holding areas;

a dispensing cap, securable to and rotatable relative to the unit chamber, having a base having a window formed therethrough, said window being selectively positionable opposite said pill holding areas;

a central hub formed on an inner side of said base for delimifing an inner boundary of said pill holding areas;

wherein rotation of the dispensing cap locates the window in alignment with successive of said pill holding areas, and when the bottle is inverted or angled upside-down, a pill in one of said pill holding areas falls through said window when said window is positioned apposite said one of said pill holding areas.

2. A pill dispensing device according to claim 1, wherein a distance between adjacent of said radial projections is slightly larger than a width of the dose of pills to be dispensed.

3. A pill dispensing device according to claim 1, wherein said central hub is one of substantially conical or cylindrical shape.

4. A device for dispensing pills, comprising:

a unit chamber fittable within or integral with the rim of a bottle, including a plurality of radial projections projecting inwardly from an inner circumference of the chamber, said radial projections defining discrete pill holding areas;

a dispensing cap, securable to and rotatable relative to the unit chamber, having a base having a window formed therethrough, said window being selectively positionable opposite said pill holding areas; and a blocking tab projecting from an inner side of said base and located substantially adjacent to said window, wherein rotation of the dispensing cap locates the window in alignment with successive of said pill holding areas, and when the bottle is inverted or angled upside-down, a pill in one of said pill holding areas falls through said window when said window is positioned opposite said one of said pill holding areas.

5. A pill dispensing device according to claim 4, wherein said blocking tab is provided substantially adjacent said central hub.

6. A pill dispensing device according to claim 4, wherein said blocking tab is integral with said central hub.

7. A pill dispensing device according to claim 4, said blocking tab further comprising a distal flange on a free end of said blocking tab.

8. A pill dispensing device according to claim 7, wherein said blocking tab is dimensioned sufficiently in length so that, when said device is in the pill dispensing position, said distal flange passes a pill in one of said pill holding areas while preventing other pills still within the bottle from dropping down into said pill holding area.

9. A pill dispensing device according to claim 1, said dispensing cap further comprising a cover hingedly attached to said base for covering the outside of said base and said window, wherein ambient air is substantially prevented from entering the bottle.

10. A pill dispensing device according to claim 1, said unit chamber further comprising a plurality of claws respectively extending below said pill holding areas.

11. A pill dispensing device according to claim 10, wherein each claw projects from said unit chamber into the bottle and has a free end.

12. A pill dispensing device according to claim 1, wherein a height of said pill holding areas is substantially as high as one pill to be dispensed.

13. A device for dispensing pills, comprising:

a unit chamber fittable within or integral with the rim of a bottle, including a plurality of radial projections projecting inwardly from an inner circumference of the chamber, said radial projections defining discrete pill holding areas;

a dispensing cap, securable to and rotatable relative to the unit chamber, having a base having a window formed therethrough, said window being selectively positionable opposite said pill holding areas;

detent means for discouraging rotation of said cap in a first direction, said detent means further comprising:

a cam member formed on at least one of said projections; and at least one tooth formed on an inner ring of said base, wherein said cam member catches on said tooth when said cap is rotated in said first direction but not when said cap is rotated in a second direction opposite said first direction, and wherein rotation of the dispensing cap locates the window in alignment with successive of said pill holding areas, and when the bottle is inverted or angled upside-down, a pill in one of said pill holding areas falls through said window when said window is positioned opposite said one of said pill holding areas.

14. A pill dispensing device according to claim 13, further comprising at least one raised bump formed on said inner ring substantially adjacent said at least one tooth, wherein when said cam member rides over said raised bump when said cap is rotated in said second direction, a sound or tactile discontinuity is generated by the cam member-bump interaction.

15. A pill dispensing device according to claim 13, wherein when said cam member rides over said tooth when said cap is rotated in said second direction, a sound or tactile discontinuity is generated by the cam member-tooth interaction.

16. A pill dispensing device according to claim 14, wherein when said cam member rides over said tooth when said cap is rotated in said second direction, a second or tactile discontinuity sound is generated by the cam member-toot interaction.

17. A pill dispensing device according to claim 1, wherein the pill to be dispensed is a measured dose of a loose powder or granulated substance.

18. A pill dispensing device according to claim 1, wherein said dispensing cap further comprises a child safety mechanism.

* * * * *